US010166700B2

(12) United States Patent
Daul

(10) Patent No.: US 10,166,700 B2
(45) Date of Patent: Jan. 1, 2019

(54) METHODS FOR DETERMINING MOLD REPLACEMENT TIMING IN SLUSH MOLD PROCESSING

(71) Applicant: Toyota Motor Engineering & Manufacturing North America, Inc., Erlanger, KY (US)

(72) Inventor: Jarrod Daul, Florence, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 216 days.

(21) Appl. No.: 15/183,364

(22) Filed: Jun. 15, 2016

(65) Prior Publication Data

US 2017/0361502 A1    Dec. 21, 2017

(51) Int. Cl.
*B29C 33/70* (2006.01)
*B29C 41/18* (2006.01)
*B29C 41/52* (2006.01)
*B29L 31/30* (2006.01)

(52) U.S. Cl.
CPC .............. *B29C 33/70* (2013.01); *B29C 41/18* (2013.01); *B29C 41/52* (2013.01); *B29C 2033/705* (2013.01); *B29L 2031/3005* (2013.01)

(58) Field of Classification Search
CPC ................................. B29C 33/70; B29C 41/18
USPC ........................................................ 264/40.1
See application file for complete search history.

(56) References Cited

U.S. PATENT DOCUMENTS

| | | | | |
|---|---|---|---|---|
| 2,601,703 A | * | 7/1952 | Sawyer .............. | B65D 81/3272 164/4.1 |
| 8,889,220 B2 | | 11/2014 | Hayashi et al. | |
| 2012/0139160 A1 | * | 6/2012 | Shade ..................... | B29C 33/02 264/311 |
| 2013/0224322 A1 | * | 8/2013 | Shizawa ................ | B29C 33/72 425/155 |
| 2014/0336806 A1 | * | 11/2014 | Bewlay ................... | G06F 17/50 700/98 |
| 2015/0001748 A1 | | 1/2015 | Suh | |

FOREIGN PATENT DOCUMENTS

KR    20150042516    4/2014

* cited by examiner

*Primary Examiner* — Nathan T Leong
(74) *Attorney, Agent, or Firm* — Dinsmore & Shohl LLP

(57) ABSTRACT

In embodiments described herein, it may be determined when to replace a degraded slush mold with a non-degraded slush mold by a method that may comprise monitoring a sample media while repeatedly contacting a surface of the sample media with an abrasive material to determine the number of contactings required to reduce a grain height of the surface of the sample media to a threshold grain height. The repeated contactings of the abrasive solution with the surface of the sample media may reduce the grain height of the sample media. The surface of the sample media may comprise a material substantially identical to the material of at least a portion of a forming surface of the slush mold.

20 Claims, 2 Drawing Sheets

METHODS FOR DETERMINING MOLD REPLACEMENT TIMING IN SLUSH MOLD PROCESSING

TECHNICAL FIELD

The present specification generally relates to slush mold processing, and particularly, to methods and systems for determining timing for replacing molds utilized in slush mold processing.

BACKGROUND

Automobile parts, such as interior materials for passenger vehicles, may be produced by various molding processes, such as slush molding. For example, dash board coverings, as well as covering for other interior vehicle features may be produced by slush mold processing. The slush molding processes may utilize molds which are complementary shaped relative to the molded part to form a desired geometry. However, there is a need for improved methods for determining proper timing for replacing molds utilizing in vehicle part manufacturing.

SUMMARY

In one embodiment, it may be determined when to replace a degraded slush mold with a non-degraded slush mold by a method that may comprise monitoring a sample media while repeatedly contacting a surface of the sample media with an abrasive material to determine the number of contactings required to reduce a grain height of the surface of the sample media to a threshold grain height. The repeated contactings of the abrasive solution with the surface of the sample media may reduce the grain height of the sample media. The surface of the sample media may comprise a material substantially identical to the material of at least a portion of a forming surface of the slush mold. The grain height of the surface of the sample media prior to contactings with the abrasive solution may be about equal to the grain height of the forming surface of the non-degraded slush mold.

In another embodiment, a degraded slush mold may be replaced with a non-degraded slush mold by a method comprising monitoring a sample media while repeatedly contacting a surface of the sample media with an abrasive solution to determine the number of contactings required to reduce a grain height of the surface of the sample media to a threshold grain height, and replacing the degraded slush mold with a non-degraded slush mold when the slush mold has undergone a number of cleanings about equal to the number of contactings required to reduce the grain height of the sample media to the threshold height. The repeated contactings of the abrasive solution with the surface of the sample media may reduce the grain height of the sample media. The surface of the sample media may comprise a material substantially identical to the material of at least a portion of a forming surface of the slush mold. The grain height of the surface of the sample media prior to contactings with the abrasive solution may be about equal to the grain height of the forming surface of the non-degraded slush mold.

In yet another embodiment, a grain pattern for an interior part of a vehicle may be selected by a method comprising monitoring a sample media while repeatedly contacting a surface of the sample media with an abrasive solution to determine the number of contactings required to reduce a grain height of the surface of the sample media to a threshold grain height, repeating the monitoring with a sample media having a different grain pattern, and selecting the grain pattern based on the how many contactings are necessary to reduce the grain height to the threshold grain height, wherein the selected grain pattern is the grain pattern which requires the most contactings to reduced the grain height to the threshold grain height. The interior part of the vehicle may be produced by slush mold processing, the slush mold processing utilizing a slush mold. The repeated contactings of the abrasive solution with the surface of the sample media may reduce the grain height of the sample media. The surface of the sample media may comprise a material substantially identical to the material of at least a portion of a forming surface of the slush mold. The grain height of the surface of the sample media prior to contactings with the abrasive solution may be about equal to the grain height of the forming surface of the non-degraded slush mold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
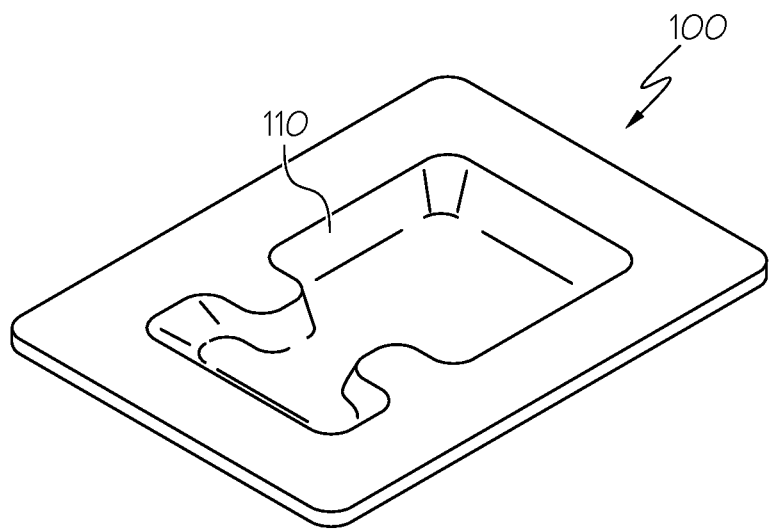
FIG. 1 schematically depicts a mold that may be utilized in slush mold processing, according to one or more embodiments shown and described herein.

Embodiments described herein generally relate to methods and systems for determining when to replace molds utilized in slush mold processing and for replacing molds following slush mold processing. Interior automotive parts, such as coverings for dash boards, may be formed from resin polymers by utilizing slush mold processing. However, continued slush mold processing (including mold cleaning steps) may degrade the mold over time, especially by reducing the height of a grain pattern on the mold. For example, the grain pattern may be degraded by successive slush molding cycles, which may include applying a release coating onto the mold, molding the interior automotive part on the mold by slush molding, and subsequently cleaning the mold following a slush molding. In some embodiments, the slush molds may be utilized for a given set of time, and may be replaced when the grain pattern is no longer sufficient to form an acceptable grain pattern in the interior automotive part. At such time, the mold is replaced.

However, such molds utilized in slush molding may be relatively expensive and difficult to produce (e.g., the mold may be solid nickel) and may need to be ordered from an outside supplier who needs adequate time to prepare a new mold. In such a situation, it may be helpful to predict when the mold will need to be replaced. For example, if such a mold replacement schedule is known, a replacement mold can be ordered with enough lead time to not hold up production of automotive parts while a new mold is being produced. Additionally, it would be helpful to know which grain patterns degrade more quickly than others so that such patterns can be utilized to reduce costs and production down-time associated with replacing a mold.

It has been found that in order to predict the timing for ordering and replacing a mold utilized in slush mold forming, in one embodiment, a sample media may be tested to model the affects of slush molding cycles on the actual mold. The sample media may comprise substantially the same material and geometric shape as a portion of the mold that will be replaced. Generally, the sample media is smaller and more mobile than the actual mold, thus allowing for easier analysis by microscope. The sample media can be monitored thoughout a process designed to replicate continued slush molding cycles on the mold. For example, monitoring of the sample media may include monitoring the grain height of the sample media following replicated cleaning steps which may degrade the grain finish of the sample media. Through analysis of the sample media, an approximate time can be determined for replacing the mold. For example, proper timing for mold replacement may be determined by monitoring the grain height of the sample media and determining how many molding cycles typically degrade the grain height to a threshold height. Once the number of cleanings is determined for the sample media, such information can be translated into predicting when the industrial mold will degrade to an unacceptable level.

Generally, the methods described herein may be utilized to determine when to replace a degraded slush mold with a non-degraded slush mold. As used herein, the term "degraded" refers to a slush mold that has been utilized in slush mold processing and has been physically degraded in subsequent cleaning steps. For example, a degraded slush mold will exhibit reduced grain height as compared with an identical slush mold that has not been utilized for slush mold processing and has not been subsequently cleaned. As used herein, the term "non-degraded" refers to a slush mold that has not been utilized in slush mold processing and subsequent corrosive cleaning steps, or has been utilized in slush mold processing so few times as to not exhibit any detectable physical degradation.

Referring to FIG. 1, a slush mold 100 is schematically depicted. A slush mold 100, sometimes referred to herein as simply a "mold", is a geometrically contoured mold utilized in slush mold processing. The slush mold 100 may comprise a forming surface 110 upon which a liquid resin is deposited to form a molded part. Generally, "slush mold processing", sometimes referred to as "slush molding", refers to the process wherein a molded body, such as an interior covering of a vehicle, is formed that has a shape which is complementary to the shape of the forming surface 110 of the slush mold 100 where the molded body is formed by a liquid resin being poured into a heated slush mold 100. Generally, the liquid resin is a thermoplastic and, upon contact with the heated slush mold 100, a viscous skin forms. Multiple layers of resin may be utilized subsequently, or a single resin layer may be utilized to from the molded product. Excess slush (e.g., resin that is no solidified by the heat of the mold) is drained off, the slush mold 100 is cooled, and the molded product is then stripped out. Generally, a cleaning step follows, which at least partially removes a build-up of release agent and/or residual resin. The cleaning step may be utilized following each molding or following a fixed number of moldings.

Figure 2:
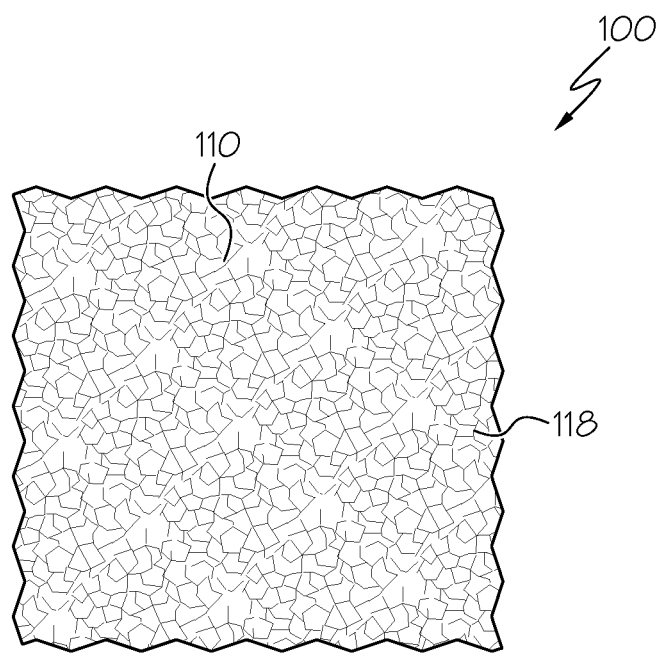
FIG. 2 schematically depicts an enlarged view of the forming surface of the mold of FIG. 1, according to one or more embodiments shown and described herein.

In some embodiments, the slush mold 100 may have a grain pattern on its forming surface 110. FIG. 2 shows an enlarged schematic view of a portion of the forming surface 110 of the slush mold 100 of FIG. 1. The grain pattern may comprise a plurality of raised portions 118 defining a grain pattern. The grain pattern may be modeled to mimic the texture of natural materials such as leather or other hides.

Figure 3:
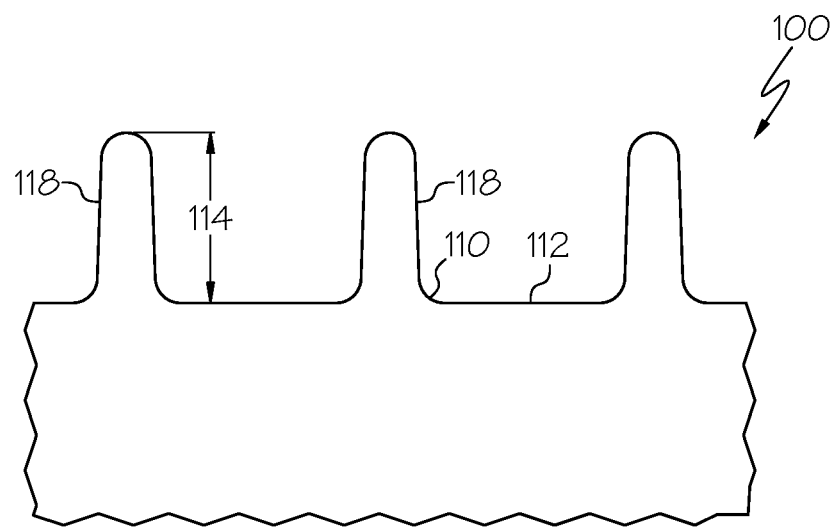
FIG. 3 schematically depicts an enlarged cross-sectional view of the forming surface of FIG. 2, according to one or more embodiments shown and described herein.

FIG. 3 schematically depicts an enlarged cross-sectional view of the forming surface 110 of FIG. 2. The raised portions 118 are raised from the base portions 112 of the forming surface 110 to define a grain height 114. As used herein, the "grain height" refers to the height of a raised portion 118 relative to the base portion 112 of the forming surface 110. It should be understood that various raised portions 118 may have different local grain heights 114, but that the grain height 114 of a surface, such as the forming surface 110, is defined as the average grain height of all raised portions 118. It should be understood that the base portions 112 may have a non-smooth texture, but that the grain height is only defined by the raised portions 118 which define the grain pattern, such as portions raised at least about 50 microns.

The forming surface 110 of the slush mold 100 may comprise or consist of Ni, such as at least about 70 wt % Ni, at least about 80 wt % Ni, at least about 90 wt % Ni, at least about 95 wt % Ni, at least about 98 wt % Ni, at least about 99 wt % Ni, at least about 99.5 wt % Ni, at least about 99.8 wt % Ni, or even at least about 99.9 wt % Ni. In another embodiment, the entirety of the slush mold 100 may comprise or consist of Ni, such as at least about 70 wt % Ni, at least about 80 wt % Ni, at least about 90 wt % Ni, at least about 95 wt % Ni, at least about 98 wt % Ni, at least about 99 wt % Ni, at least about 99.5 wt % Ni, at least about 99.8 wt % Ni, or even at least about 99.9 wt % Ni.

In embodiments, the grain height 114 of the forming surface 110 of the slush mold 100 may be at least about 80 microns, at least about 85 microns, at least about 90 microns, at least about 95 microns, at least about 100 microns, at least about 105 microns, at least about 110 microns, at least about 115 microns, at least about 120 microns, at least about 130 microns, at least about 140 microns, at least about 150 microns, or even at least about 200 microns, and/or may be less than or equal to about 300 microns, less than or equal to about 250 microns, less than or equal to about 200 microns, less than or equal to about 175 microns, less than or equal to about 150 microns, less than or equal to about 140 microns, less than or equal to about 130 microns, less than or equal to about 120 microns, less than or equal to about 110 microns, less than or equal to about 100 microns, or combinations thereof. For example, the grain height of the forming surface 110 of the slush mold 100 may be from about 85 microns to about 130 microns, or from about 90 microns to about 125 microns. In one embodiment, the grain height of the slush mold 100 may be from about 100 microns to about 125 microns in a non-degraded state, and may be reduced following slush molding cycles which may include contact by a cleaning agent such as an aluminum oxide containing slurry.

As described hereinabove, a degraded slush mold may have a reduced grain height, and may be replaced once the grain height is reduced to an amount unsuitable for continued use in slush molding. The reduction in grain height may be due to cleaning steps. For example, in some embodiments of slush mold processing, a release coating may be applied to the forming surface 110 prior to the application of the resin. The release coating may aid in the release of the molded resin, but may also stick to the mold and may build up in a film. Such a buildup may undesirably increase the gloss of the molded product. In order to remove the buildup, a cleaning process can be utilized following each molding process or following multiple molding processes. In one embodiment, the cleaning may comprise contacting the forming surface 110 with an abrasive material, such as a slurry which includes a cleaning agent such as an aluminum oxide mixed with water. Such a cleaning process may be referred to as wet honing. While a slurry-based cleaning is described herein, it should be understood that other abrasive cleaning methods are contemplated, such as contacting the forming surface 110 with other chemical cleaning agents. Such other methods may also reduce the grain height.

Once the grain height is reduced to a level unsuitable for slush molding, the mold is replaced. The grain height at which the mold is replaced is referred to herein as the "threshold grain height." The threshold grain height may vary based on quality tolerance and application of the molded product. For example, the threshold grain height may be less if one is willing to accept lower quality molded parts (less grain definition caused by reduced grain height), and greater if one is not willing to accept low quality molded parts. In embodiments, the threshold grain height may be from about 75 microns to about 105 microns, from about 80 microns to about 100 microns, or from about 85 microns to about 95 microns. The threshold grain height can be determined by measuring the grain height of a slush mold once it is no longer suitable for use due to wear.

Figure 4:
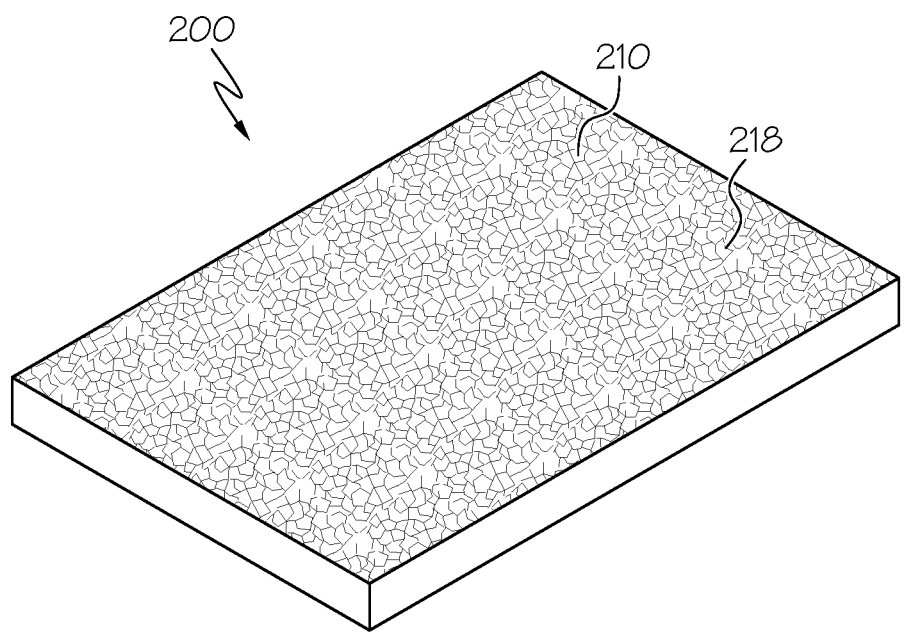
FIG. 4 schematically depicts a sample media utilized in the methods described herein, according to one or more embodiments shown and described herein.

In order to determine when to replace a degraded slush mold with a non-degraded slush mold, a sample media may be utilized to model the results of grain degradation on the slush mold. FIG. 4 depicts an example of a sample media 200. The sample media 200 may comprise a surface 210 which includes raised portions 218 which is similar or even substantially identical to that of at least a portion of the forming surface 110 of a slush mold 100. For example, FIG. 3 may be representative of the surface of the sample media 200. Repeated contactings of an abrasive solution (such as a cleaning agent) with the surface of the sample media may reduce the grain height of the sample media. By monitoring the sample media while repeatedly contacting a surface 210 of the sample media 200 with an abrasive material, the number of contactings required to reduce a grain height of the surface 210 of the sample media 200 to a threshold grain height may be determined.

For example, a surface 210 of the sample media 200 may comprise a material substantially identical to the material of at least a portion of a forming surface 110 of the slush mold 100. The surface 210 of the sample media 200 may comprise Ni, such as at least about 70 wt % Ni, at least about 80 wt % Ni, at least about 90 wt % Ni, at least about 95 wt % Ni, at least about 98 wt % Ni, at least about 99 wt % Ni, at least about 99.5 wt % Ni, at least about 99.8 wt % Ni, or even at least about 99.9 wt % Ni. In another embodiment, the entirety of the sample media 200 may comprise Ni, such as at least about 70 wt % Ni, at least about 80 wt % Ni, at least about 90 wt % Ni, at least about 95 wt % Ni, at least about 98 wt % Ni, at least about 99 wt % Ni, at least about 99.5 wt % Ni, at least about 99.8 wt % Ni, or even at least about 99.9 wt % Ni.

In embodiments, the grain height of the surface 210 of the sample media 200 may be about equal to the grain height 114 of the forming surface 110 of the non-degraded slush mold 100. In embodiments, the grain height of the surface 210 of the sample media 200 may be at least about 80 microns, at least about 85 microns, at least about 90 microns, at least about 95 microns, at least about 100 microns, at least about 105 microns, at least about 110 microns, at least about 115 microns, at least about 120 microns, at least about 130 microns, at least about 140 microns, at least about 150 microns, or even at least about 200 microns, may be less than or equal to about 300 microns, less than or equal to about 250 microns, less than or equal to about 200 microns, less than or equal to about 175 microns, less than or equal to about 150 microns, less than or equal to about 140 microns, less than or equal to about 130 microns, less than or equal to about 120 microns, less than or equal to about 110 microns, less than or equal to about 100 microns, or combinations thereof. For example, the grain height (non-degraded) of the surface 210 of the sample media 200 may be from about 85 microns to about 130 microns, or from about 90 microns to about 125 microns. In one embodiment, the grain height of the sample media 200 may be from about 100 microns to about 125 microns in a non-degraded state, and may be reduced following contactings by corrosive cleaning agents.

In embodiments, the monitoring of the sample media 200 may comprise measuring the grain height of the sample media 200 following one or more contactings with an abrasive material. The grain height may be measured with a 3D mapping microscope. A 3D mapping microscope may be capable of generating images and collecting data related to relative height and texture of a surface, and the differences in height between portions of surfaces. For example, a Keyence VHX-5000 Microscope may be utilized to measure the grain height of the sample media 200.

In one embodiment, a sample media 200 that has about the same grain height as a non-degraded slush mold is contacted by a cleaning agent by a process that is substantially identical to that utilized in cleaning a slush mold. In such a process, a sample media 200 is contacted by the cleaning agent and is then analyzed for grain height reduction. In embodiments, a contacting equal to one cleaning step to a slush mold may be a set number of passes with a slurry expelling device. The set number of passes is equal to the number of passes usually utilized to clean the slush mold in a cleaning step. The same number of passes can be used on the sample media to estimate a cleaning step. For example, if the cleaning of the mold 100 requires 10 passes by a slurry, then a contacting step of the sample media 200 would include 10 passes by the slurry.

By utilizing the sample media, it can be determined the approximate number of contactings with an abrasive material that a slush mold can withstand before it is replaced. Once the number of contactings is determined, it may be determined when a new non-degraded slush mold will need to be introduced into processing. A replacement mold can be ordered with advance notice so that production is not halted while a replacement mold is fabricated. In embodiments, the degraded slush mold may be replaced with a non-degraded slush mold when the slush mold has undergone a number of cleanings about equal to the number of contactings required to reduce the grain height of the sample media to the threshold height.

In other embodiments, the grain pattern of the slush mold can be selected such that the grain wear is decreased following cleanings by abrasive agents. For example, testing can be conducted on numerous sample media which each have a different grain pattern to determine which grain pattern requires the most contactings to reduce its grain height to the threshold grain height. For example, various grain patterns which mimic visually distinct leather materials may be analyzed to determine which can be utilized more often without need to replace the costly mld 100. With such a process, grain patterns may be selected which are more durable to cleaning steps following molding cycles.

It should now be recognized that molds that are utilized for slush mold processing degrade over time with cleaning steps. However, it is valuable to determine in advance of needed replacement when a mold will need to be replaced. Testing sample media can provide valuable information related to mold degradation. In addition, the sample media may be tested and analyzed for degradation for a relatively small amount of cost as compared with testings conducted on a full scale mold.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining when to replace a degraded slush mold with a non-degraded slush mold, the method comprising:
    monitoring a sample media while repeatedly contacting a surface of the sample media with an abrasive material to determine the number of contactings required to reduce a grain height of the surface of the sample media to a threshold grain height, wherein:
        the repeated contactings of the abrasive material with the surface of the sample media reduces the grain height of the sample media;
        the surface of the sample media comprises a material substantially identical to the material of at least a portion of a forming surface of the non-degraded slush mold; and
        the grain height of the surface of the sample media prior to contactings with the abrasive material is about equal to the grain height of the forming surface of the non-degraded slush mold.

2. The method of claim 1, wherein the threshold grain height is from about 75 microns to about 105 microns.

3. The method of claim 1, wherein the abrasive material is a slurry containing an aluminum oxide.

4. The method of claim 1, wherein the grain height of the non-degraded slush mold is from about 85 microns to about 130 microns.

5. The method of claim 1, wherein the monitoring comprises measuring the grain height of the sample media following one or more contactings.

6. The method of claim 5, wherein the grain height is measured with a 3D mapping microscope.

7. The method of claim 1, wherein the contacting is substantially identical to the contacting of the abrasive material with the non-degraded slush mold to clean the non-degraded slush mold.

8. The method of claim 1, wherein the degraded slush mold has a grain height of less than or equal to the threshold grain height.

9. The method of claim 1, wherein the surface of the sample media comprises at least about 70 wt. % Ni and the forming surface of the non-degraded slush mold comprises at least about 70 wt. % Ni.

10. The method of claim 1, wherein the threshold grain height corresponds with the smallest grain height suitable for using the degraded slush mold in slush mold processing.

11. A method for replacing a degraded slush mold with a non-degraded slush mold, the method comprising:
    monitoring a sample media while repeatedly contacting a surface of the sample media with an abrasive material to determine the number of contactings required to reduce a grain height of the surface of the sample media to a threshold grain height, wherein:
        the repeated contactings of the abrasive material with the surface of the sample media reduces the grain height of the sample media;
        the surface of the sample media comprises a material substantially identical to the material of at least a portion of a forming surface of the non-degraded slush mold; and
        the grain height of the surface of the sample media prior to contactings with the abrasive material is about equal to the grain height of the forming surface of a non-degraded slush mold; and
    replacing the degraded slush mold with a non-degraded slush mold when the degraded slush mold has undergone a number of cleanings about equal to the number of contactings required to reduce the grain height of the sample media to the threshold height.

12. The method of claim 11, wherein the threshold grain height is from about 75 microns to about 105 microns.

13. The method of claim 11, wherein the abrasive material is a slurry containing an aluminum oxide.

14. The method of claim 11, wherein the grain height of the non-degraded slush mold is from about 85 microns to about 130 microns.

15. The method of claim 11, wherein the monitoring comprises measuring the grain height of the sample media following one or more contactings.

16. The method of claim 15, wherein the grain height is measured with a 3D mapping microscope.

17. The method of claim 11, wherein the contacting is substantially identical to the contacting of the abrasive material with the non-degraded slush mold to clean the non-degraded slush mold.

18. The method of claim 11, wherein the degraded slush mold has a grain height of less than or equal to the threshold grain height.

19. The method of claim 11, wherein the surface of the sample media comprises at least about 70 wt. % Ni and the forming surface of the non-degraded slush mold comprises at least about 70 wt. % Ni.

20. A method for selecting a grain pattern for an interior part of a vehicle, the method comprising:
    monitoring a sample media with a given grain pattern while repeatedly contacting a surface of the sample media with an abrasive material to determine the number of contactings required to reduce a grain height of the surface of the sample media to a threshold grain height, wherein:
the interior part of the vehicle is produced by slush mold processing, the slush mold processing utilizing a non-degraded slush mold;
the repeated contactings of the abrasive material with the surface of the sample media reduces the grain height of the sample media;
the surface of the sample media comprises a material substantially identical to the material of at least a portion of a forming surface of the non-degraded slush mold; and
the grain height of the surface of the sample media prior to contactings with the abrasive material is about equal to the grain height of the forming surface of the non-degraded slush mold; and
repeating the monitoring with a sample media having a different grain pattern; and
selecting the grain pattern based on the how many contactings are necessary to reduce the grain height to the threshold grain height, wherein the selected grain pattern is the pattern which requires the most contactings to reduce the grain height to the threshold grain height.

* * * * *